(12) United States Patent
Yaman et al.

(10) Patent No.: US 10,581,216 B2
(45) Date of Patent: Mar. 3, 2020

(54) 3D WAVEGUIDE FOR EFFICIENT COUPLING OF MULTIMODE PUMP AND SIGNALS TO A MULTICORE FIBER AMPLIFIER

(71) Applicant: NEC Laboratories America, Inc., Princeton, NJ (US)

(72) Inventors: Fatih Yaman, Princeton, NJ (US); Shaoliang Zhang, Princeton, NJ (US); Eduardo Mateo Rodriquez, Tokyo (JP); Takanori Inoue, Tokyo (JP); Yoshihisa Inada, Tokyo (JP); Takaaki Ogata, Tokyo (JP)

(73) Assignee: NEC Corporation (JP)

( * ) Notice: Subject to any disclaimer, the term of this patent is extended or adjusted under 35 U.S.C. 154(b) by 320 days.

(21) Appl. No.: 15/586,209

(22) Filed: May 3, 2017

(65) Prior Publication Data

US 2018/0109067 A1 Apr. 19, 2018

Related U.S. Application Data

(60) Provisional application No. 62/341,398, filed on May 25, 2016, provisional application No. 62/480,640, filed on Apr. 3, 2017.

(51) Int. Cl.
| | | |
|---|---|---|
| *H01S 3/094* | (2006.01) | |
| *H01S 3/067* | (2006.01) | |
| *H01S 3/16* | (2006.01) | |
| *G02B 6/12* | (2006.01) | |
| *G02B 6/28* | (2006.01) | |

(52) U.S. Cl.
CPC .... *H01S 3/094053* (2013.01); *H01S 3/06737* (2013.01); *H01S 3/094003* (2013.01); *H01S 3/094019* (2013.01); *H01S 3/094038* (2013.01); *H01S 3/094069* (2013.01); *G02B 6/12002* (2013.01); *G02B 6/2804* (2013.01);
(Continued)

(58) Field of Classification Search
CPC ......... H01S 3/094053; H01S 3/094049; H01S 3/094057; G02B 6/12002; G02B 6/12247; G02B 6/2804
See application file for complete search history.

(56) References Cited

U.S. PATENT DOCUMENTS

2009/0148098 A1* 6/2009 Lewis .................. G02B 6/2804
  385/31
2009/0251770 A1* 10/2009 Lewis ................ G02B 6/03633
  359/341.3
(Continued)

FOREIGN PATENT DOCUMENTS

EP 3029860 8/2016

OTHER PUBLICATIONS

Jin et al, Annular-cladding erbium doped multicore fiber for SDM amplification, published Nov. 4, 2015 © 2015 OSA Nov. 16, 2015 | vol. 23, No. 23 | DOI:10.1364/OE.23.029647 | Optics Express 29648.

(Continued)

*Primary Examiner* — Eric L Bolda
(74) *Attorney, Agent, or Firm* — Joseph Kolodka

(57) ABSTRACT

An optical communication substrate includes a plurality of cores to communicate optical signals; a rectangular input delivering a pump laser, and a shaped portion to combine the optical signals and the pump laser into a ring geometry at an output.

17 Claims, 10 Drawing Sheets

(52) U.S. Cl.
CPC ....... *H01S 3/06729* (2013.01); *H01S 3/06754* (2013.01); *H01S 3/1608* (2013.01)

(56) References Cited

U.S. PATENT DOCUMENTS

| | | | |
|---|---|---|---|
| 2013/0163072 A1* | 6/2013 | Chang | H01S 3/06737 359/341.3 |
| 2014/0270644 A1* | 9/2014 | Holland | G02B 27/0994 385/43 |
| 2017/0279242 A1* | 9/2017 | Yaman | H01S 3/094049 |

OTHER PUBLICATIONS

Jin, Characterization of Annular Cladding Erbium-Doped 6-Core Fiber Amplifier, OFC 2016 © OSA 2016.
Abedin, Multicore Erbium Doped Fiber Amplifiers for Space Division Multiplexing Systems, Journal of Lightwave Technology, vol. 32, No. 16, Aug. 15, 2014.

* cited by examiner

3D WAVEGUIDE FOR EFFICIENT COUPLING OF MULTIMODE PUMP AND SIGNALS TO A MULTICORE FIBER AMPLIFIER

BACKGROUND

The present invention relates to communication using optical amplifiers with multiple cores.

FIG. 1A shows an example of a single-core fiber where the optical light is guided inside the core. FIG. 1B shows an example of a multi-core fiber that has multiple cores inside the same fiber therefore capable of guiding multiple signals simultaneously in parallel. The cores in a multi-core fiber can be arranged in many different ways. In general, the cores have a higher refractive index than the surrounding cladding so that the light can be guided inside the cores with minimal loss.

In current transmission systems only single-core fibers are used for transmission. After transmission, the loss in the fiber is compensated for by using optical amplifiers. In general, these amplifiers are called fiber amplifiers as the amplification occurs in fibers. Commonly, these fiber amplifiers are doped fiber amplifiers, and most commonly such amplifiers are doped with erbium. Without loss of generality, the discussion below is directed at erbium doped fiber amplifiers (EDFAs) even though the system would work with other types of fiber amplifiers.

FIG. 2 shows an exemplary optical transmission system where the transmitter converts data to optical signals that transmit over optical fiber spans and the loss of the spans are compensated by optical amplifiers. The receiver converts the optical signals back into the transmitted data.

FIG. 3 shows an exemplary optical fiber amplifier set up with an Erbium-doped fiber (EDF), a Wavelength division multiplexing (WDM) coupler and a laser diode (LD). The WDM coupler combines the pump laser with the signal so they can co-propagate in the amplifying medium which is the EDF. Inside the EDF pump power is transferred to the signal and the signal comes out with more power than it entered the amplifier. In current systems, almost all of the amplifiers have single cores. Moreover, in current systems, the transmission signal is always in a single mode, therefore the EDFs also support only a single mode. As a result, in current systems, the pump lasers also produce single-mode lasers. The reason for using single-mode pump is that, if the pump is multimoded (multimode pump), then the multimode light generated by the pump cannot be efficiently launched into an EDF that supports only a single mode. The power produced by a multimode pump is distributed over many modes. A single-mode EDF accepts only a single mode and all the power in the rest of the pump laser modes that cannot be launched into the single mode of the EDF would be wasted.

Nevertheless, if the light from the multimode laser could be delivered efficiently to the EDF there would be several significant advantages to using a multimode pump instead of a single mode pump. First, single-mode pumps cannot generate very high power. Typically output from a single-mode pump is below 1 W, sometimes it can go up to 2 W. Multimode pumps can easily generate more than 10 W. Second, a single-mode pump is more expensive than a multimode pump. Third, multimode pumps are more reliable than single-mode pumps because they typically have a lower resistivity than single-mode pumps. Fourth, multimode pumps are more efficient in converting electrical power to optical power. This can be a significant advantage especially in submarine type optical transmission system where the electrical power has to be supplied to the pumps inside the amplifier from ends of a cable that can span thousands of km. This IR pertains to a method of efficiently replacing multiple single-mode pump lasers with a single multimode laser.

It has been shown that one system application for replacing single-mode pumps with multimode pumps is the case of multicore fiber amplifiers. The motivation behind using multicore fiber amplifiers instead of single mode amplifiers is to reduce the cost and packaging size. In typical transmission systems, multiple transmission systems are placed together in parallel. For instance, in the case of submarine transmission a cable may contain multitude of fibers each carrying a signal in parallel with its own dedicated amplifiers.

FIG. 4 shows replacing a transmission system that has multiple transmission fibers and amplifiers with single multicore fibers and multicore amplifiers. The fan in (FI) device would take the signal from each transmitter and launches into individual cores of a multicore fiber (MCF). A plurality of multicore amplifiers (MCAs) would amplify signal from individual cores of the MCF individually in the cores of the MCA. The fan out (FO) device would take the signal coming from each core and deliver them to individual receivers. It is possible not to replace the single core fibers by MCFs, but still use MCAs to amplify the signal from multiple single core fibers inside individual cores of an MCA.

FIG. 5 shows an example where multiple single core amplifiers can be replaced by a single MCA. One advantage of this arrangement is the reduction in cost and packaging size. Multiple components on the left are replaced by single components on the right. Such integration can reduce both cost and size. Another advantage is that instead of using multiple single-mode pumps one can use a single multi-mode pump. In this case, note that a multi-mode pump can deliver as much power as multiple single mode pumps. Moreover, it is possible to direct different modes of a multimode pump to different cores of the MCA even if the cores of the MCA support only a single or a few modes only. This allows for a more efficient use of the power from multi-mode pump which is distributed into multitudes of modes as opposed to trying to launch many modes of the multi-mode pump into a single core which can accept only one of the modes, now it is possible to direct different modes of the multi-mode pump into individual cores of an MCA. State of the art systems operate with the pump power launched into the cladding of the MCA and little of the pump power actually overlaps with the signals which are confined to the cores. Signal can only derive power from the portion of the pump that it coincides with physically inside the amplifier. In general when the pump is launched into the entire fiber cladding, the portion of the pump that remains inside the cores is very little. Under such circumstances, first, most of the pump power would go to waste. Second, quality of the signal suffers as the pump intensity that overlaps with the signal cannot create enough so called upper state population. When upper state population is not high enough amplifiers add large amount of noise to the signal.

To mitigate this impact a pump waveguide is added to the multicore EDF that surrounds the cores of the amplifier and boosts the level of pump inside that pump waveguide around the cores. Other solutions include:

(1) Adding a cladding layer to concentrate the pump power around the cores that carry the signal.

(2) Using multicore amplifiers with a hollow center.

FIG. 6 shows a multicore EDF example including a pump waveguide drawn as a ring surrounding the 4 cores carrying the signal. In such a design, the ring area that is designed to concentrate the pump power has a higher refractive index than the surrounding cladding area so that it can guide the pump but it has a lower refractive index than the cores so that the signal would not leak out into the pump waveguide. In this approach, the pump was coupled into the fiber through cladding, in other words from the side of the fiber. With this kind of launch, the pump would just pass through the pump ring and still disperse all around the entire fiber. In order to make sure pump remains only inside the pump waveguide area, the pump has to be launched only into the waveguide from the ends of the fiber (not from the sides of the fiber). In such a case it is not possible to make sure that the pump remains inside the waveguide area and it still disperses all around the fiber with a negligible increase in the pump power inside the waveguide area.

FIG. 7 shows an exemplary hollow center multi-core EDF. The fiber is a glass ring with multiple cores in it where signals are carried. The center of the fiber is hollow. In this case, the pump can still be combined through the sides of the fiber, but because there is nowhere else for the pump to go, the pump would be concentrated around the cores in a narrow ring. However, this method has various disadvantages. First, it is difficult to fabricate high quality fibers with hollow centers. Second, such fibers lack strength because of the hollow center. Third, such fibers are susceptible to dirt and other contaminants that can be almost impossible to clean once they go into the hollow center. Fourth, these fibers are more difficult to splice to standard fibers because of the hollow core. Fifth, these fibers would have large loss for the pump because the fibers have to be jacketed for easy manipulation, handling and protection. Once they are jacketed, the pump light would come into contact with the jacket and pump would experience large loss.

SUMMARY

In another aspect, a 3D laser written glass substrate having a plurality of cores to transmit optical signals; a rectangular input delivering a plurality of signals to respective cores and a pump light from the rectangular input, and a shaped portion to combine the optical signals and the pump light into a ring geometry at an output.

In a further aspect, a fiber amplifier device includes a substrate having a plurality of optical signal carrying structures formed thereon, the substrate including: an input section adapted to be coupled to a laser pump output and a plurality of cores, wherein the cores are optically coupled to the optical signal carrying structures; and a 3D waveguide extending from the input section with a laser pump waveguide having a rectilinear shaped end and a ring-shaped end surrounding the plurality of optical signal carrying structures.

In yet another aspect, a method to improve a quality of multicore amplifiers includes increasing an overlap between a multimode pump and a plurality of optical signals using a 3D waveguide that simultaneously couples the output of the pump with the optical signals; and increasing the overlap between the pump and the optical signals.

Advantages of the system may include one or more of the following. The system provides an efficient way to deliver the pump light into the pump waveguide ring and only to the pump waveguide ring so that all of the pump light remains inside that ring. This way, the system avoids a hollow center and all the disadvantages of the hollow center. Also, the approach supports a cladding that surrounds the pump waveguide region so that jacketing around the cladding would not affect the pump or the signals. Also, the pump light remains concentrated inside the pump waveguide ring. The system supports optical amplifiers with multiple cores can be advantageous to multiple optical amplifiers each having a single core, which is the part of the amplifier where the optical signal is guided. Multicore amplifiers can have the advantage because they would integrate multiple amplifiers into a single one and therefore save cost and space. Moreover, it is possible to reduce components. For instance, instead of using one pump per core, one can have a single pump to amplify multiple cores. In addition, one can use a multimode pump to replace multiple single mode pumps. The system also offers the advantages of using a multimode pump instead of multiple single-mode pumps. First, the cost of multimode pump is typically less than single-mode pumps. Second a single multi-mode pump can generate the same amount of optical power as several single-mode pumps. Third, multi-mode pumps have better electrical power to optical power conversion efficiency compared to single-mode pumps. Fourth, multi-mode pumps are more reliable.

DESCRIPTION

Figure 8A:
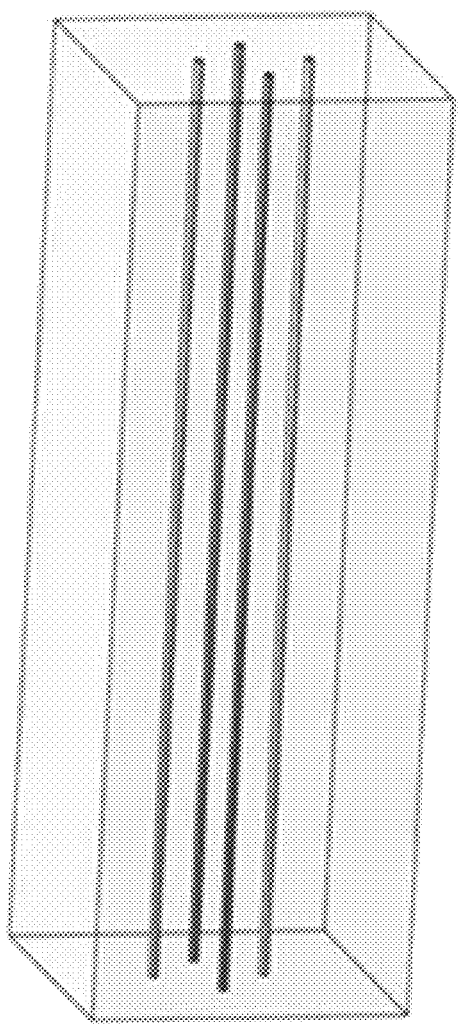
FIGS. 8A-8B show two exemplary perspective views of an exemplary glass slab embodiment with 4 cores formed therein.
Figure 8B:
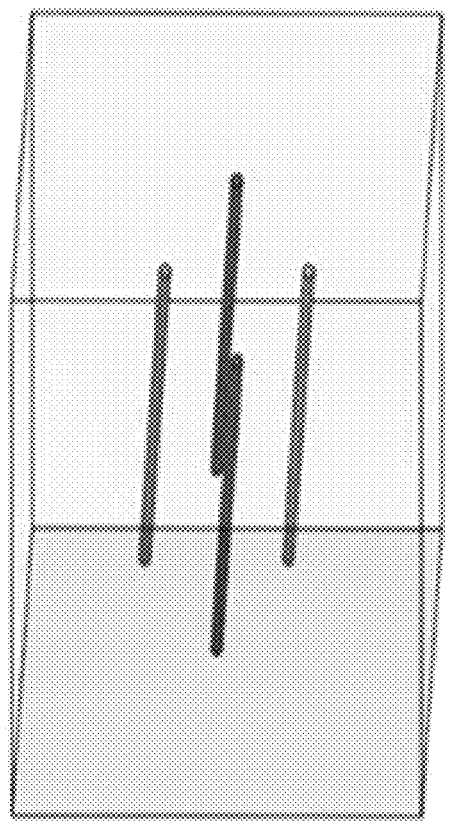

FIGS. 8A-8B shows two perspective views of an exemplary glass slab embodiment with 4 cores formed therein. In this embodiment, the fiber cores have a matching geometry to the multicore fiber examples detailed above. The embodiment uses a 3D waveguide that can be written in various different media and using multitude of methods. For example, the 3D waveguide can be directly written into glass slabs using a laser. In one embodiment, 3D direct laser writing is used to form the cores in the glass as an example. Lasers focused on a certain region of the glass can modify the refractive index only in that region where the laser is focused with a high intensity. Such waveguides can be prepared with low loss and in many different shapes and geometry. Such directly written waveguides can be used to couple or split light, to filter light, among others. In FIG. 8A, the example slab is prepared in matching geometry to the examples of multicore fibers shown in the previous examples. Light from multiple cores of an MCF can be launched into cores in the glass slab easily with little loss. The waveguide written glass slab is used to couple the pump light into a pump waveguide ring inside the glass slab where the geometry of the waveguide ring would match the geometry of the waveguide ring inside the multicore EDF shown in FIG. 6.

Figure 9:
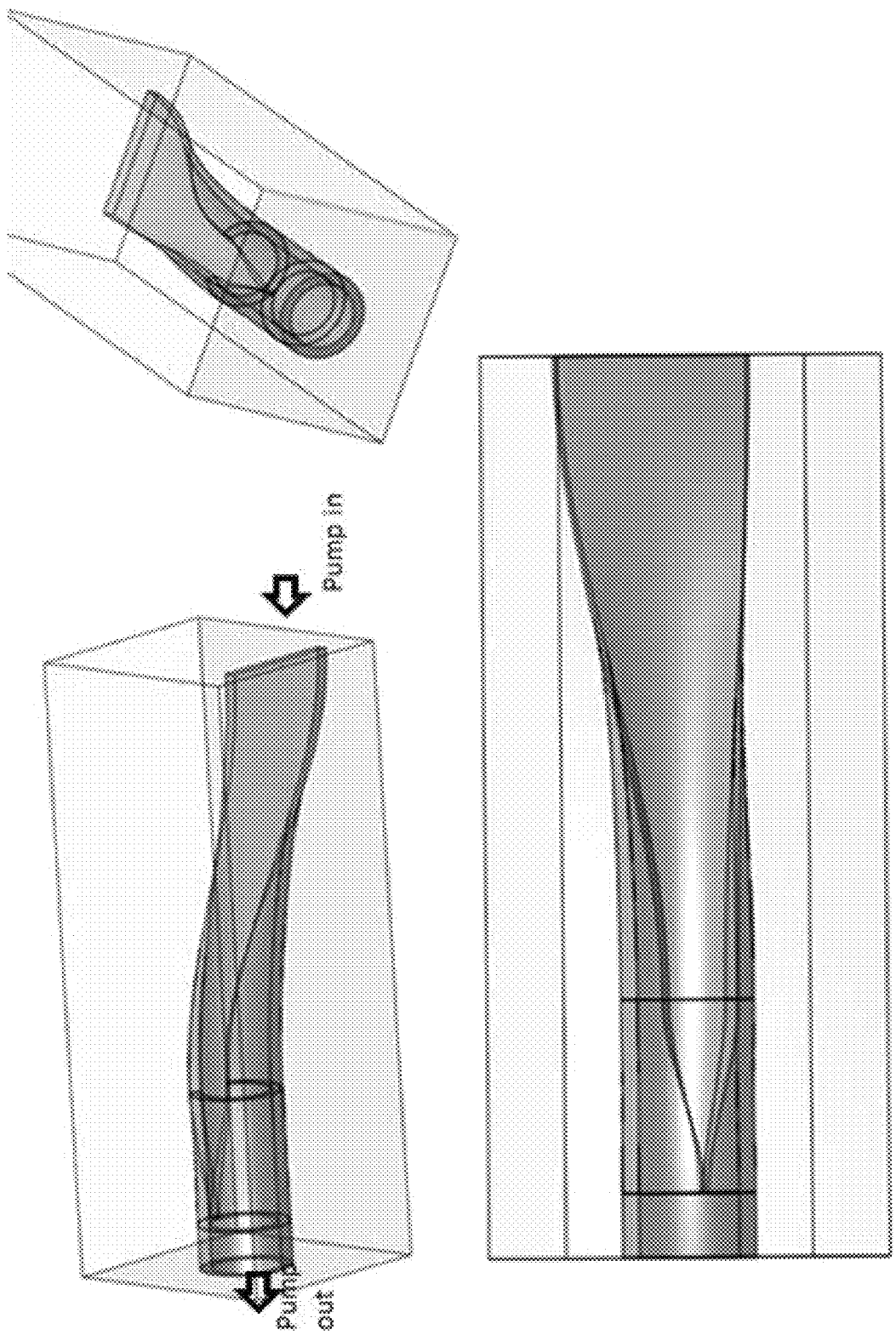
FIG. 9 shows from multiple perspectives an example of a 3D laser written glass slab to convert the profile of a pump laser light from rectangular to ring profile.

FIG. 9 shows an example of a 3D laser written glass slab to convert the profile of a pump laser light from rectangular to ring profile. The shape of the waveguide profile can be described as a rectangular paper rolled into a circle at one end. In FIG. 9 the waveguide is shown as 3 pieces for ease of viewing, but the waveguide is a single and smooth block. In general, the multimode pump laser diodes have a rectangular output profile. The glass slab of FIG. 9 can take the entire pump laser in rectangular shape from one end and convert it adiabatically in a smooth fashion into the shape of a ring without significant loss in the pump power in the other end. Due to the flexibility of 3D direct waveguide writing, the cores of FIGS. 8A-8B and FIG. 9 in the same glass slab which would turn our slab into a WDM coupler that would couple the signal light and the pump.

Figure 10:
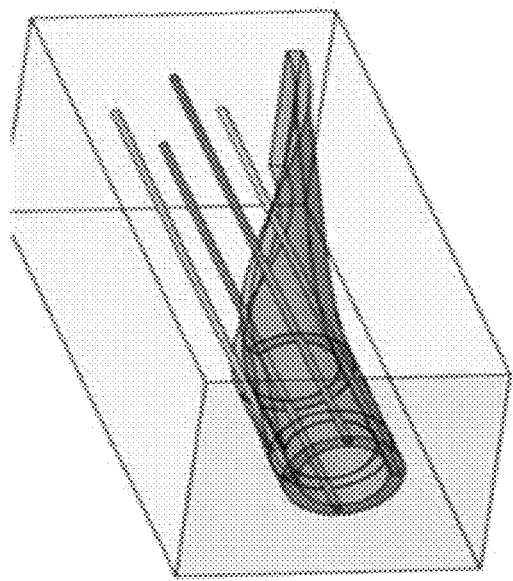
FIG. 10 shows an example of a 3D laser written glass substrate where it would take in signals into the 4 cores and it would also take in pump light from the rectangular input and combined the signal cores and the pump light into the ring geometry at the output.
Figure 10:
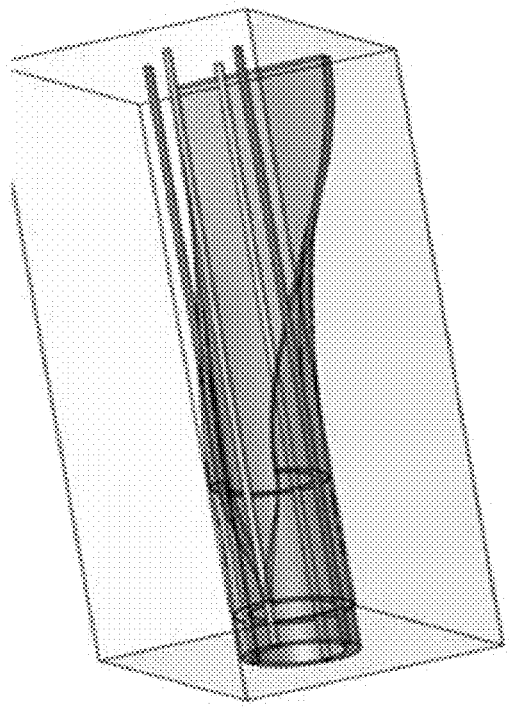
Figure 10:
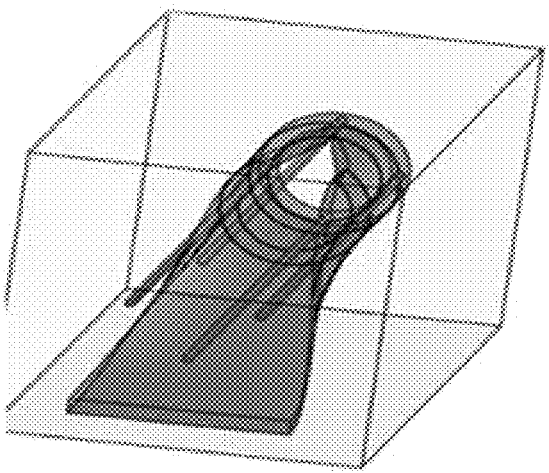

FIG. 10 shows an example of a 3D laser written glass substrate combination of FIGS. 8A-8B and 9 as one structure carrying optical signals in the 4 cores and pump light from the rectangular input and combine the signal carrying cores and the pump light into the ring geometry at the output. Here the side with the ring shape is the output and the waveguide is for the pump. The rods show the cores that carry the signals.

Figure 1B:
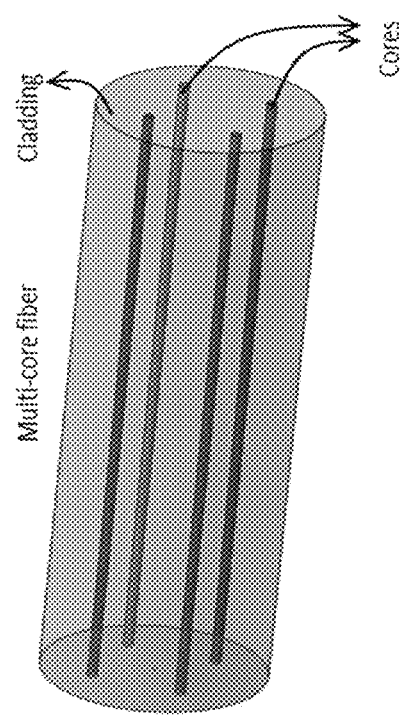
FIG. 1B shows an example of a multi-core fiber that has multiple cores inside the same fiber therefore capable of guiding multiple signals simultaneously in parallel.
Figure 1A:
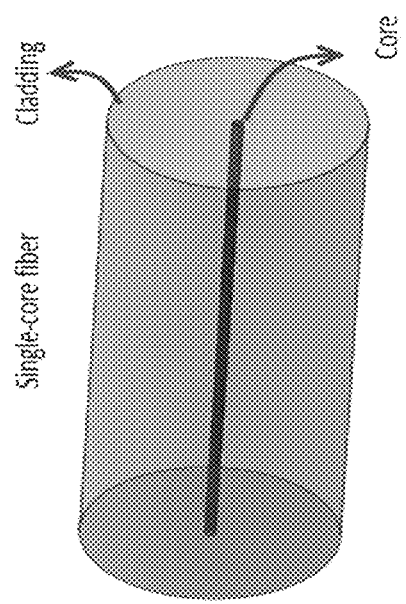
FIG. 1A shows an example of a single-core fiber where the optical light is guided inside the core.
Figures 1B, 2:
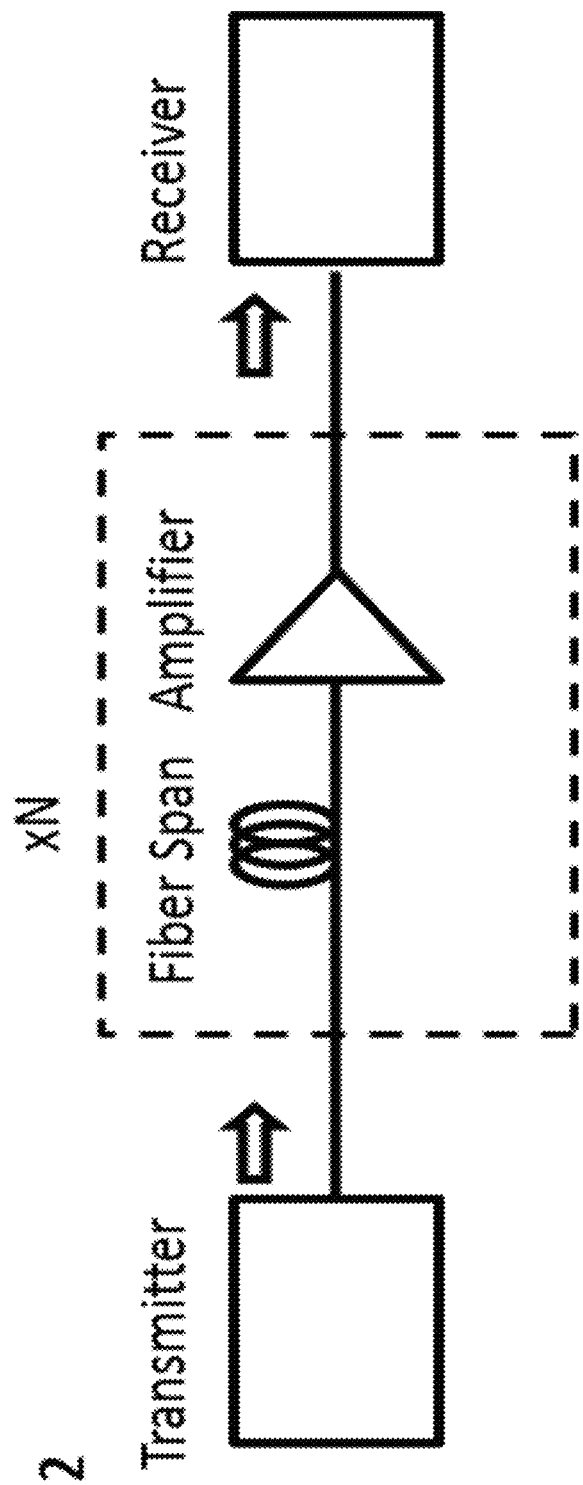
FIG. 2 shows an exemplary optical transmission system where the transmitter converts data to optical signals that transmit over optical fiber spans and the loss of the spans are compensated by optical amplifiers.
Figure 3:
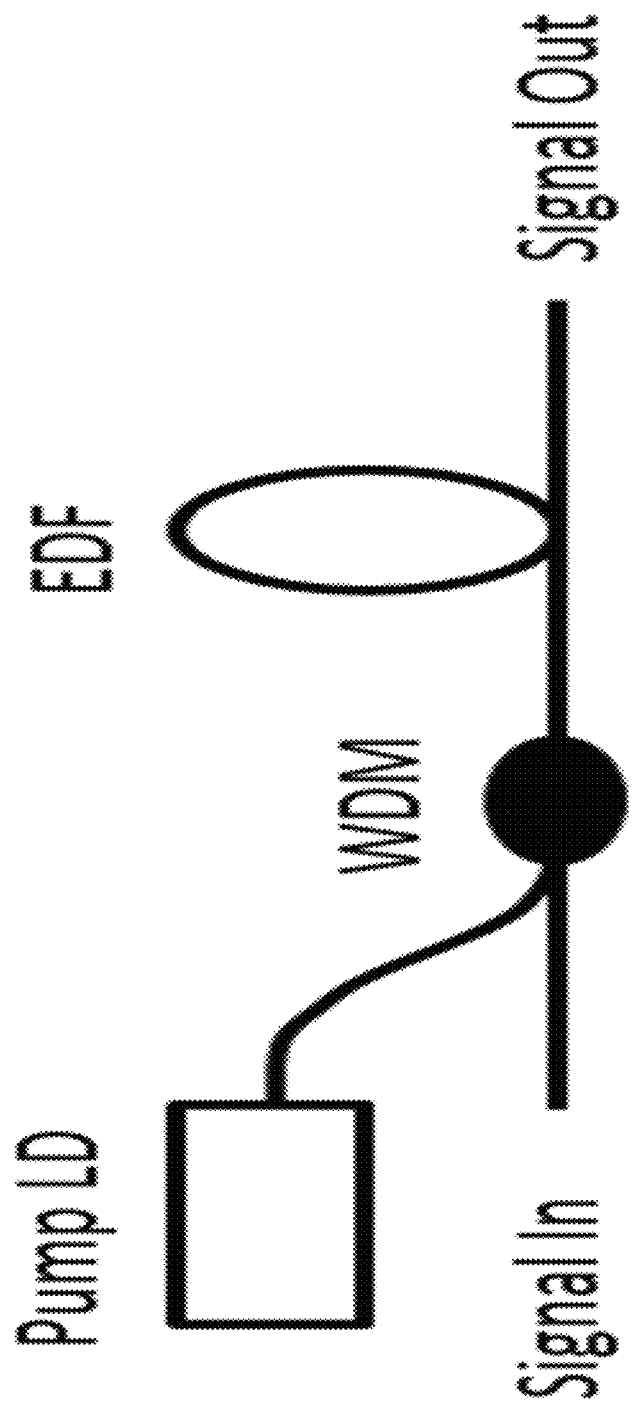
FIG. 3 shows an exemplary optical fiber amplifier set up.
Figure 4:
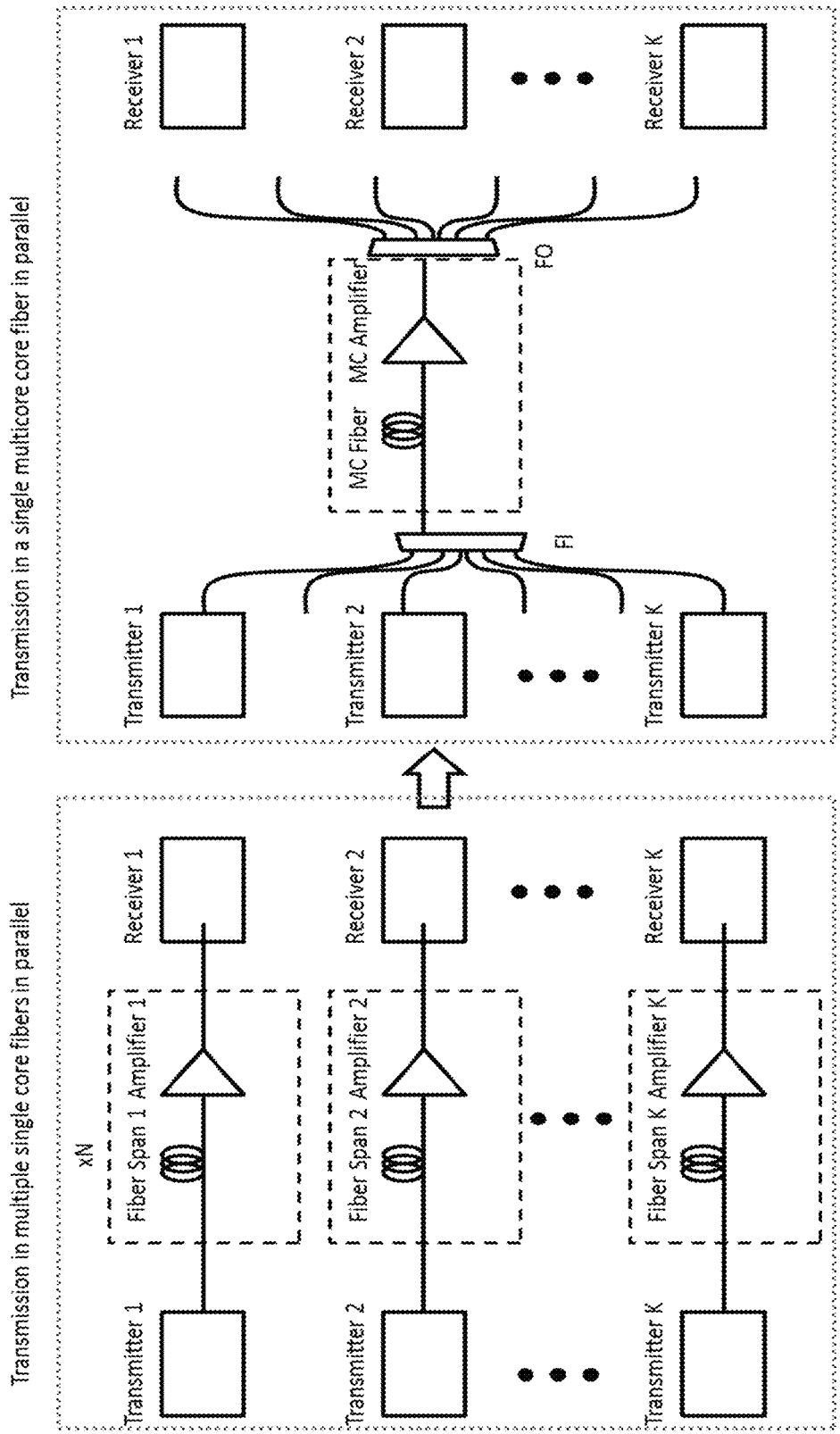
FIG. 4 shows an exemplary replacement of a transmission system that has multiple transmission fibers and amplifiers with single multicore fibers and multicore amplifiers.
Figure 5:
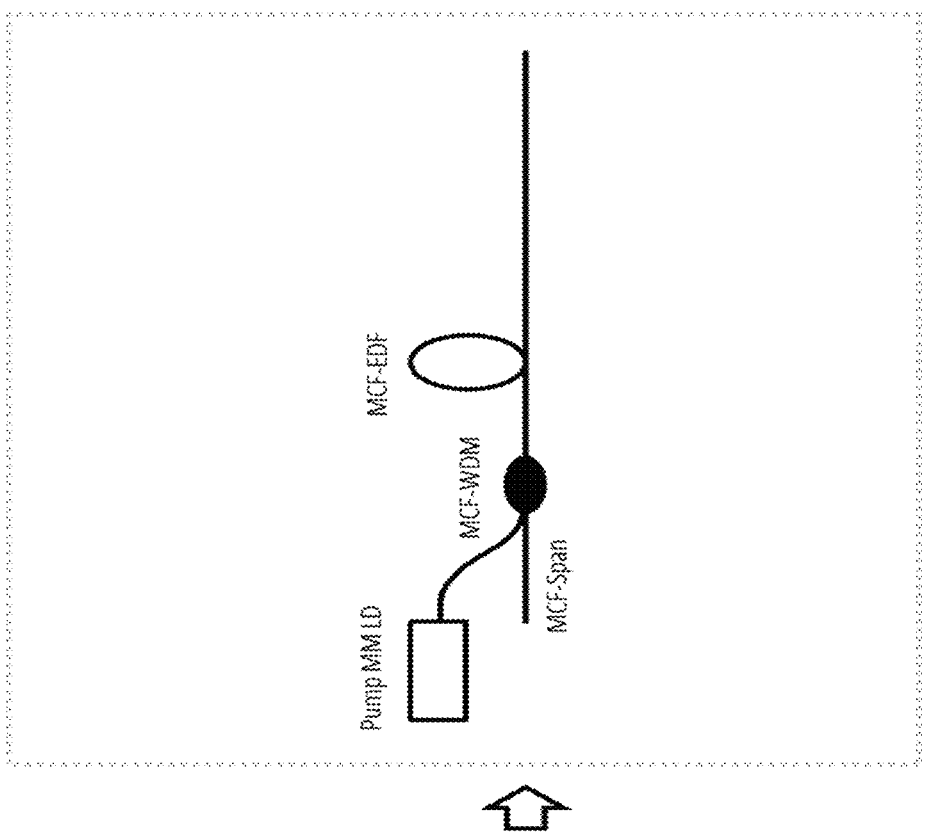
FIG. 5 shows an example where multiple single core amplifiers can be replaced by a single MCA.
Figure 5:
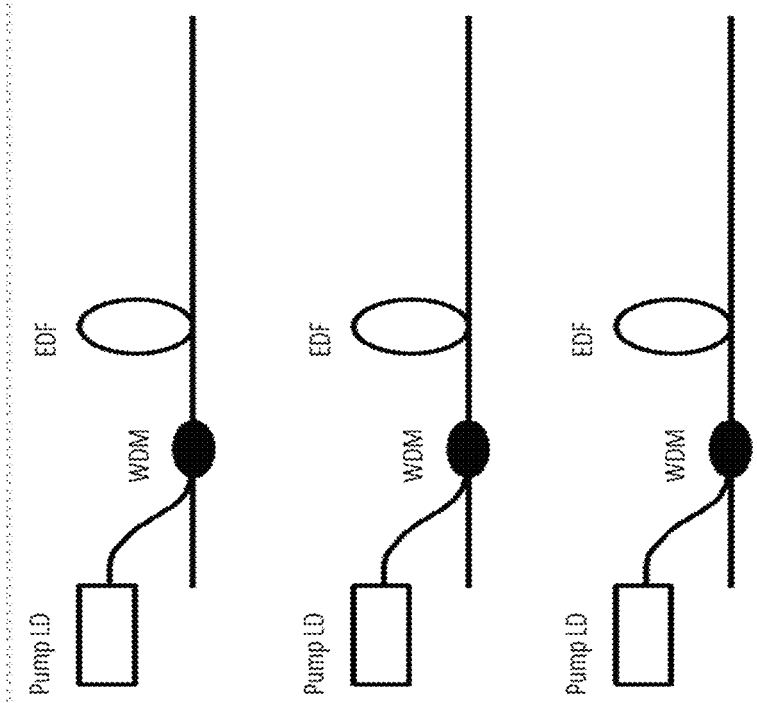
Figure 6:
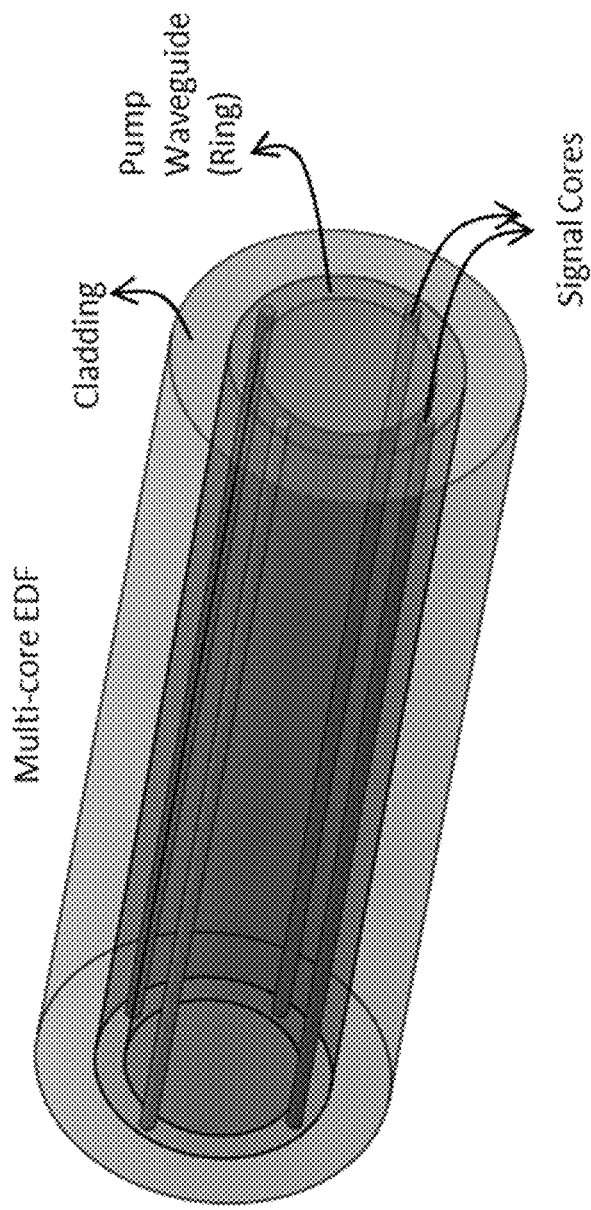
FIG. 6 shows a multicore EDF example including a pump waveguide drawn as a ring surrounding the 4 cores carrying the signal.
Figure 7:
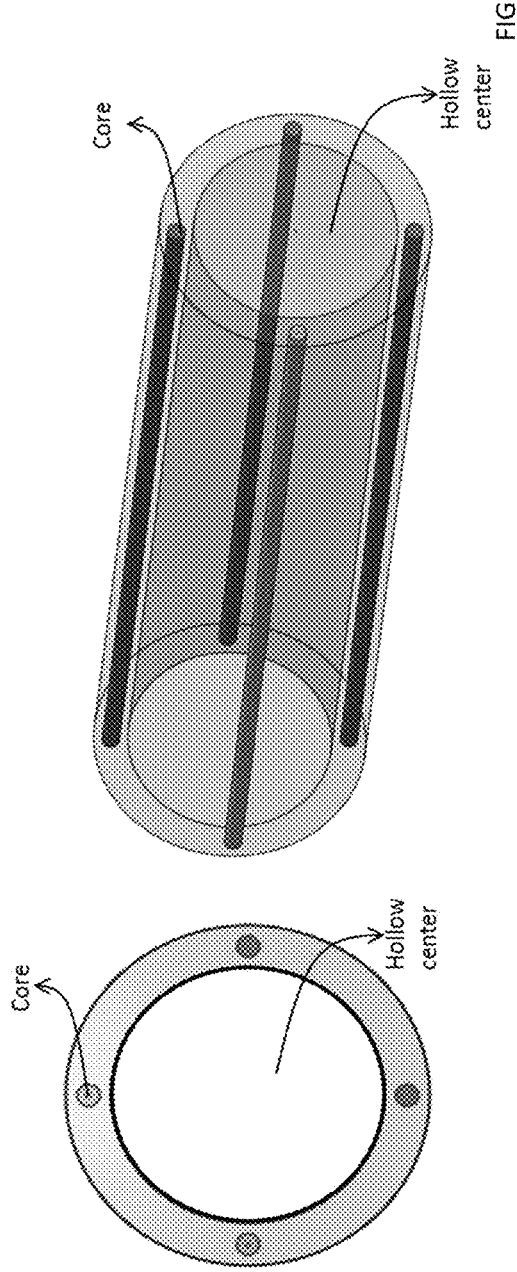
FIG. 7 shows an exemplary hollow center multi-core EDF.

The system of FIG. 10 leverages the design in FIG. 6 with a structure to deliver the pump light into the pump waveguide ring and only to the pump waveguide ring so that all of the pump remains inside that ring. This way, the embodiment of FIG. 10 avoids a hollow center and all the disadvantages that comes with it. Also, this embodiment can still have a cladding that surrounds the pump waveguide region so that jacketing around the cladding would not affect the pump or the signals. Additionally, the embodiment ensures that all of the pump output remains concentrated inside the pump waveguide ring. Here the waveguides should be arranged so that the refractive index of the pump waveguide should be larger than the glass substrate but smaller than the refractive indices of the signal cores.

Figure 11:
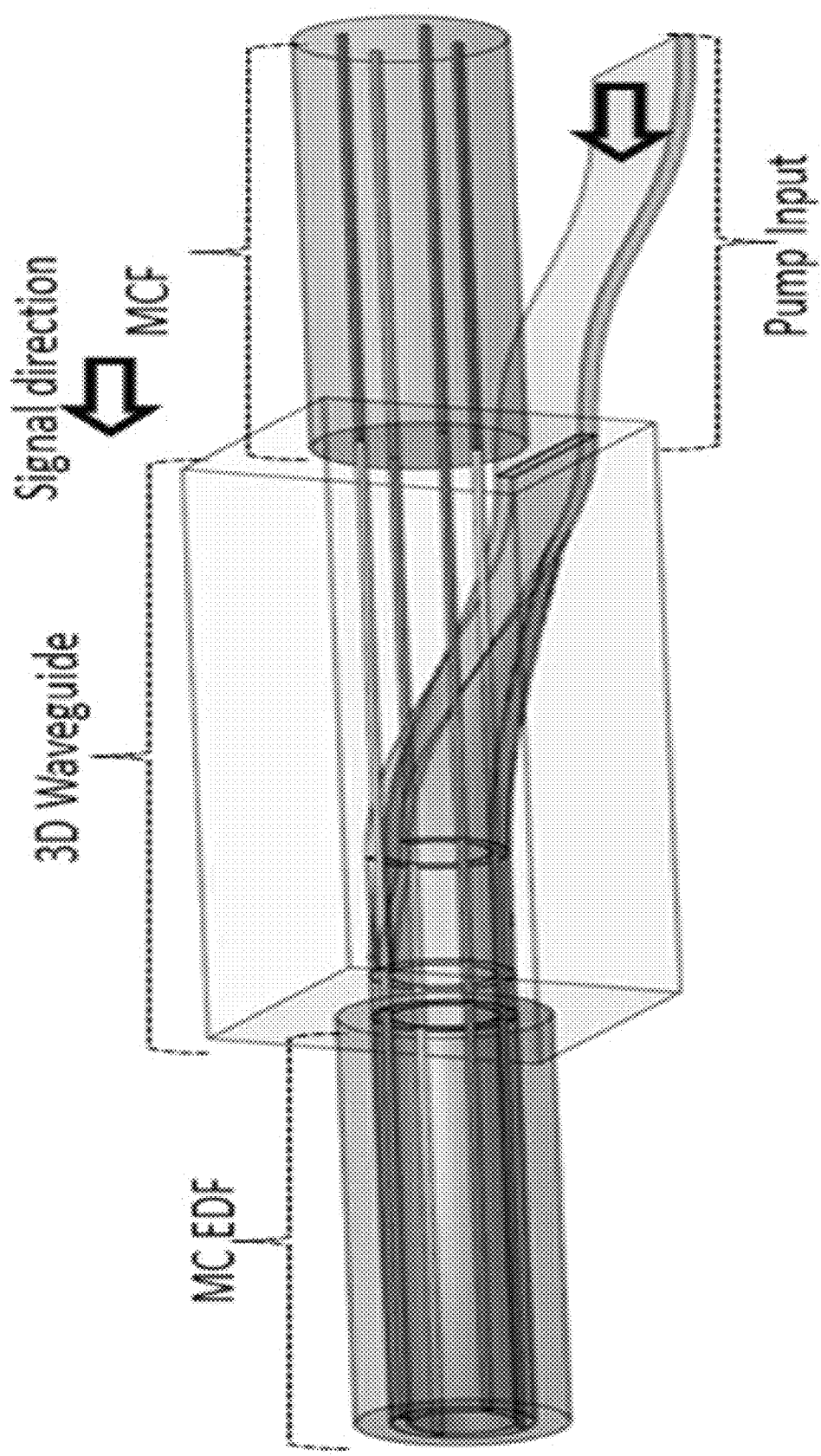
FIG. 11 shows an example of a multicore erbium-doped fiber amplifier where the 3D direct laser written glass substrate is used to efficiently couple the multiple cores as well as the pump laser into the pump waveguide ring.

FIG. 11 shows an example of a multicore erbium-doped fiber amplifier where the 3D direct laser written glass substrate is used to efficiently couple the multiple cores as well as the pump laser into the pump waveguide ring. The signal propagating in the multicore fiber is coupled into the cores in the glass substrate that were designed to match the core in the MCF. At the same time the pump laser is coupled into the rectangular waveguide input in the substrate. In the example shown in FIG. 11, the multimode diode pump is not shown, and it is assumed that a waveguide brings the multimode pump laser from the laser diode to the substrate. However, the pump laser can also be launched into the laser waveguide inside the substrate by other methods such as direct butt coupling. Clearly, in this case, the multimode pump laser would be efficiently coupled into the pump waveguide ring in the multicore EDF. Note that the pump waveguide ring in the multicore EDF can support multitude of modes and therefore be able support most not if all of the power from the multimode pump. Since the pump laser would be launched into the pump waveguide ring from the ends of the ring, the pump laser would be confined into the waveguide ring. As a result the pump would be able to efficiently amplify the signals in the cores with high efficiency and with low noise.

An advantage of 3D waveguide (3D-WG) is to separate the arrangement of the cores in the fiber, or the geometry of the multicore transmission fiber, from the geometry of the amplifiers. As such, the transmission fiber geometry and the amplifier geometry can be optimized separately. For instance, in the amplifier fiber, the cores may align in a linear fashion, and after amplification, they may be rearranged to interface the transmission fiber in a circular, hexagonal, or linear geometry.

The instant system achieves the best geometry where the overlap between the signal profile and the pump profile is the maximum. The system is not constrained with the fact that the waveguide structure (secondary cladding) that guides the pump has to be much wider than the cores. Basically, pump power is distributed in a larger area. Once the area of secondary cladding is minimized without losing much pump power, the system can squeeze in as many cores inside that secondary cladding as much as possible while controlling the cross-talk between the cores.

In one exemplary embodiment, for the same electrical power spent on the pump diodes, the system can amplify more signals by using multimode pump+3DWG+multicore EDF instead of multiple single-mode single-core EDFAs. For instance, existing EDFAs need 500 mW pump power at about 2V driving voltage and 800 mA driving current and such systems can get 1.6 W per amplifier with a plug efficiency of 31%. Using a multimode pump with a plug efficiency of 50% and 32 W electrical power consumption, corresponding to 16 W optical pump output power, it is possible to pump 20 EDF cores with the same noise performance. For single-mode single-core case, that the core diameter is 3 micron. We get, pump intensity=17.6 mW/(mm^2), For the multimode case, the pump should be contained in an area of 909 mm^2. Thus, for single-mode, single-core EDF, single-mode single-core pump power of 500 mW and a core radius=3 mm, the intensity is 17.6 mW/(mm^2). For a Multimode Pump with No insertion loss from 3D-WG, the pump power of 30 W, cylinder area=5 mm×100 mm, the intensity is 60 mW/(mm^2), and with a 30% coupling efficiency from 3D-WG, the intensity is 18 mW/(mm^2).

In one example, the geometry of the signal carrying cores (4 of them in this example) may not be the same in the multi-core fiber (MCF), and multi-core EDF (MC-EDF). For instance, in the MCF the cores may be placed at the corners of a square, whereas in the MC-EDF they may be arranged to be side by side in a linear fashion. The good thing about having these 3D-WG is that they can match the geometry of the cores at one end (for example the MCF end), while they can modify the path of the cores so that they can match the geometry of the cores at the MC-EDF end. This can be advantageous because the best geometry for the MCF and MC-EDF may not be the same. Thus, the cores match the location of the cores in the MCF at the input end, while the placing of the cores at the output surface of the 3D-WG match the location of the cores in the MC-EDF.

In another embodiment, general erbium-doped fiber amplifiers (EDFAs) include many components such as pump laser, an erbium-doped fiber (EDF), a WDM coupler that couples pump and the signal etc. An EDFA transfers power from pump to signal. This power transfer is done by erbium ions placed inside the EDF or erbium-doped fiber. The embodiment can dope the 3D waveguide which is also typically made from glass to form a 3D-erbium-doped waveguide (3D-EDWG). The result is a device where the 3D waveguide has erbium-doped cores, where the amplification takes place inside the 3D-WG and there is no need to use multitude of EDFs.

The examples discussed so far have an MCF at the input and an MC-EDF on the other end of the 3D-WG. However, this can be generalized to include other cases. For instance, it does not have to be an MCF. In one example, instead of an MCF with 4 cores, the system could have 4 single-core fibers connecting to the input end, with each single-core fiber coupled to one of the cores inside the 3D-EDWG. Alternatively, it is possible to have 4 single-core EDFs on the output end, and all the possible combinations thereof.

The amplifier design may be altered in many ways, for instance the pump and signal may travel in opposite directions in which case it would be called a backward pumped amplifier. Alternatively, the number of cores may be different, or the cores may be organized in a different fashion than shown in the examples here. The pump maybe coupled into the glass substrate in many different ways. It is also contemplated that, the multicore fiber can be replaced by a number of single core fibers, and the signal from each single core can be launched into a different core in the glass substrate. 3D waveguide can be glass or other material. The 3D waveguides may be generated by direct laser writing or other techniques.

In other embodiments, the amplification itself can be integrated into the 3D-WG. For instance, if the 3D-WG can be doped by an active ions, for instance erbium, the erbium doped fiber can be replaced and the amplification can be integrated with the 3D-WG. The erbium concentration can be much higher than with erbium-doped fibers and this would achieve amplification with a much more compact device and significantly lower noise figure. Many amplifiers, and amplification stages can be integrated into the same 3D-WG.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments have been described in detail, it should be understood that the various changes, substitutions, and alterations could be made hereto without departing from the spirit and scope of the invention.

What is claimed is:

1. A fiber amplifier device, comprising:
    a substrate having a plurality of optical signal carrying structures formed thereon, the substrate including:
        an input section adapted to be coupled to a laser pump output and a plurality of cores, wherein the cores are optically coupled to the optical signal carrying structures; and
        a 3D waveguide extending from the input section with a laser pump waveguide having a rectilinear shaped end and a ring-shaped end surrounding the plurality of optical signal carrying structures.

2. The device of claim 1, wherein the amplifier comprises a multicore erbium-doped fiber (EDF) amplifier.

3. The device of claim 1, wherein the 3D waveguide comprises a 3D direct laser written glass substrate.

4. The device of claim 1, comprising a pump laser coupled to the rectilinear shaped end.

5. The device of claim 4, wherein the pump laser comprises a laser diode, wherein the 3D waveguide brings a multimode pump laser from the laser diode to a substrate.

6. The device of claim 1, comprising a pump laser launched into the 3D waveguide inside the substrate or launched using direct butt coupling.

7. The device of claim 1, wherein the 3D waveguide supports multitude of modes.

8. The device of claim 1, wherein pump laser is confined in the 3D waveguide.

9. The device of claim 1, comprising a direct laser writing system to form the structures in the substrate.

10. The device of claim 9, wherein the laser writing system is focused on a predetermined region of the glass to modify a refractive index only in the predetermined region where the laser is focused with a high intensity.

11. The device of claim 1, wherein the 3D waveguides is used to couple light, split light, or filter light.

12. The device of claim 1, wherein the pump and optical signals travel in opposite directions as a backward pumped amplifier.

13. The device of claim 1, wherein the cores are evenly spaced apart or unevenly spaced apart.

14. The device of claim 1, wherein the plurality of cores comprise a multicore fiber (MCF).

15. An optical communication system, comprising:
    a plurality of cores to communicate optical signals;
    a rectangular input delivering a pump laser, and
    a shaped portion to combine the optical signals and the pump laser into a ring geometry at an output.

16. The system of claim 15, comprising a 3D waveguide with erbium-doped cores, wherein an amplification takes place inside a 3D-WG without multitude of EDFs.

17. The system of claim 15, comprising 4 single-core fibers connecting to an input end, with each single-core fiber coupled to one core inside a 3D-WG.

* * * * *